United States Patent [19]

Naudin

[11] Patent Number: 5,119,692
[45] Date of Patent: Jun. 9, 1992

[54] DAMPED DOUBLE FLYWHEEL, IN PARTICULAR FOR AUTOMOTIVE VEHICLES

[75] Inventor: Jacky Naudin, Metz-Vallieres, France

[73] Assignee: Valeo, Paris, France

[21] Appl. No.: 674,383

[22] Filed: Mar. 25, 1991

[30] Foreign Application Priority Data

Mar. 26, 1990 [FR] France .................. 90 03822

[51] Int. Cl.⁵ .............................................. F16F 15/10
[52] U.S. Cl. ........................ 74/573 F; 192/106.1
[58] Field of Search .............. 74/573 F, 574; 192/106.2, 106.1

[56] References Cited

U.S. PATENT DOCUMENTS

| | | | |
|---|---|---|---|
| 4,588,058 | 5/1986 | Aliouate | 192/106.2 |
| 4,783,895 | 11/1988 | Reik | 74/573 F X |
| 4,874,074 | 10/1989 | Damon et al. | 192/106.2 |
| 4,890,710 | 1/1990 | Reik et al. | 74/574 X |
| 4,892,008 | 1/1990 | Naudin et al. | 74/574 |
| 4,903,544 | 2/1990 | Naudin et al. | 192/106.2 |
| 4,914,799 | 4/1990 | Kyle | 192/106.2 X |
| 4,944,499 | 7/1990 | Tojima | 74/574 |
| 4,946,420 | 8/1990 | Jackel | 192/106.2 X |
| 4,978,324 | 12/1990 | Casse | 192/106.2 X |
| 5,005,686 | 4/1991 | Reik et al. | 192/106.2 |

FOREIGN PATENT DOCUMENTS

| | | |
|---|---|---|
| 3545401 | 7/1987 | Fed. Rep. of Germany .... 74/573 F |
| 2626335 | 7/1989 | France . |
| 2633686 | 1/1990 | France . |

*Primary Examiner*—Dwight Diehl
*Attorney, Agent, or Firm*—Longacre & White

[57] ABSTRACT

In a damped double flywheel comprising two coaxial inertia masses which are mounted for relative rotation with respect to each other, against the action of springs and a viscous damper having a sealed, fluid-filled, cavity, the viscous damper is mechanically interposed between the two inertia masses, and comprises two closure members which are spaced apart axially by a spacer member so as to define its cavity. Each of the closure members is joined to the spacer member by at least one continuous weld seam.

8 Claims, 2 Drawing Sheets

DAMPED DOUBLE FLYWHEEL, IN PARTICULAR FOR AUTOMOTIVE VEHICLES

FIELD OF THE INVENTION

This invention relates to double damped flywheels, in particular for automotive vehicles, being of the kind comprising two coaxial inertia masses which are mounted for relative rotation with respect to each other against the action of resilient means and against the action of a viscous damping means, which is provided for the purpose of braking the relative movement between the said masses.

BACKGROUND OF THE INVENTION

A double flywheel of the above kind is described in the specification of U.S. Pat. No. 4,903,544 and the corresponding French published patent application No. FR 2 626 336A. In those documents, the viscous damping means is arranged radially inward of the resilient means, being mechanically coupled between the two masses. The resilient means are housed in a first cavity.

The said viscous damping means includes a second sealed cavity which is filled with a second fluid, different from the fluid in the first cavity. The viscous damping means is mounted axially on one of the inertia masses. It is suitably dimensioned to suit the application intended for the double flywheel, in such a way as to give a predetermined degree of damping. The cavity is defined by two closure or cover members which are fixed to an external support element which acts as a spacer member. These cover members are joined to each other by means of screws which extend through the spacer member and which are fastened, at least in rotation and optionally with a clearance, to a damper plate.

Centring spigots are also provided for centring the spacer member and the cover plates.

With this arrangement, the radial size of the spacer member is such that it can accommodate these fastening screws and centring spigots, and sealing members are also necessary in this connection so as to ensure that the cavity is properly sealed. All this leads to an increase in the radial size of the viscous damping means, and calls for the use of a large number of components.

DISCUSSION OF THE INVENTION

An object of the present invention is to overcome these drawbacks, and thereby to reduce the number of components and the size of the spacer members, while also producing other advantages.

According to the invention, a damped double flywheel comprising two coaxial masses which are mounted for relative rotation with respect to each other against the action, for braking of the relative movement between the two said masses, firstly of resilient means and secondly of a viscous damping means comprising a sealed cavity, wherein the viscous damping means is mechanically interposed between the two said masses and comprises two closure members which are spaced apart axially from each other by an annular, peripheral spacer member whereby to define the said cavity, is characterised in that each of the said closure members is secured by at least one continuous weld seam to the annular spacer member, whereby the radial size of the latter is reduced.

This arrangement enables the radial size of the viscous damping means to be reduced, and also leads to improved distribution of the forces involved.

It will be appreciated that the active part of the viscous damping means is able to remain unchanged, the only change being the reduction of the thickness of the spacer member. In a variant, for a given radial size, it is possible to increase the radial size of the said active part of the viscous damping means in such a way that in no case can the performance of the latter be at all reduced.

In addition, the number of components is reduced since the fastening screws, centring spigots and some of the sealing members are no longer necessary: the weld seams themselves ensure the necessary sealing.

In addition, the axial thickness of the viscous damping means can also be reduced due to the absence of screw heads or rivet heads. The actual welding operation is preferably carried out by a laser process. The welding process may be of the edge-to-edge type, or inclined so as to produce weld seams inclined with respect to each other, i.e. inclined with respect to a common radial plane. Welding may also be carried out by penetration welding, in particular of the circular type, to produce weld seams which are so configured as to follow the profile of the teeth of the viscous damping means, or so as to have a circular configuration. The welding process may also involve some spot welding.

Having regard to the gain in radial size, the viscous damping means can itself be driven by its closure members, which enables the latter to be simplified. It also enables the axial size of the viscous damping means to be reduced, and also the applied forces in the region of the cavity of the viscous damping means.

Optionally, a second series of springs may also be incorporated between the two inertia masses.

The description of preferred embodiments of the invention which follows, illustrates the invention in greater detail, with reference to the accompanying drawings.

BRIEF DESCRIPTION OF THE DRAWINGS

FIG. 5 is a view similar to FIG. 4, but shows a fourth embodiment.

DESCRIPTION OF PREFERRED EMBODIMENTS OF THE INVENTION

Figure 1:
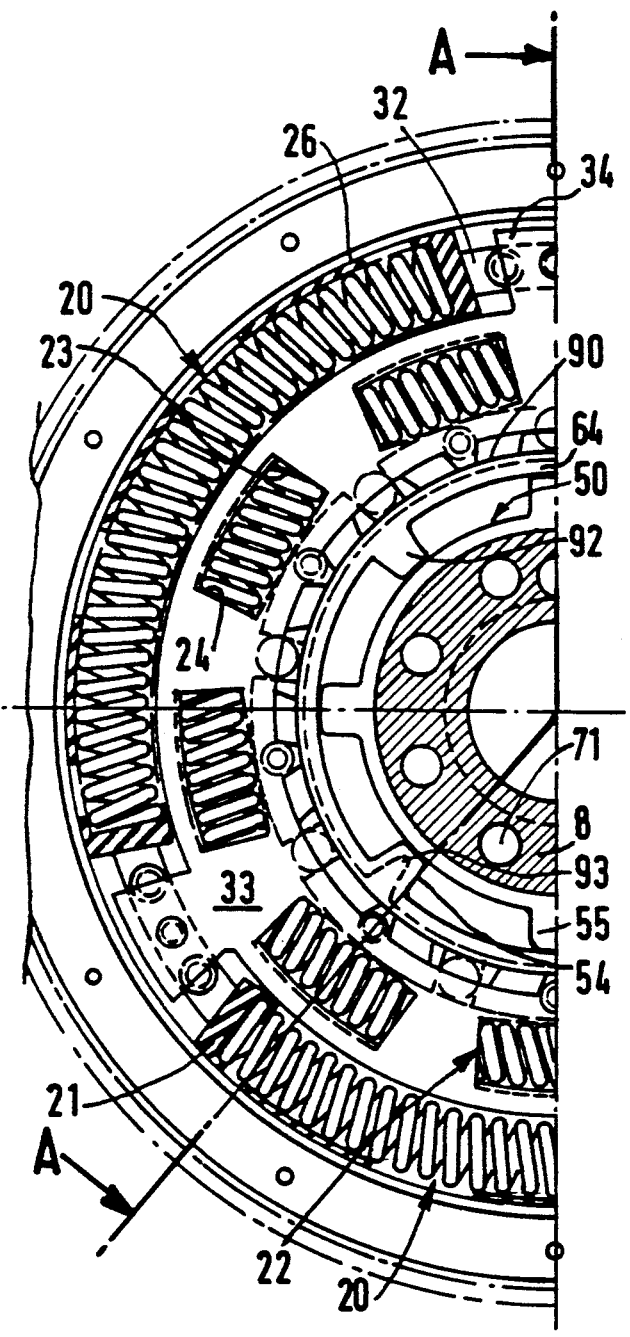
FIG. 1 is a partial half view in front elevation, showing a double flywheel showing the interior of the cavities comprised in it.

The damped double flywheel for an automotive vehicle which is shown in the drawings comprises two coaxial inertia masses 1 and 10, which are mounted for relative rotation with respect to each other, against the action both of circumferentially acting resilient means 20, 22 and of a viscous damping device 60.

The first mass 1 comprises a hollow, annular housing 3, which is closed by a cover plate 5 and by a central hub comprising two members 8 and 108. These components are all secured to the nose of the crankshaft of the internal combustion engine of the vehicle, by means of a plurality of bolts 2 which pass through holes 71 formed in the hub 8, 108 and in the housing 3. The housing 3 is secured through its base to the hub member 8 by means of screws 61, and carries a starting crown 4 on its axially oriented outer peripheral flange. The cover plate 5, which is generally annular in shape and hollow in the middle, is secured by means of further screws 6 to the housing flange.

Guide rings 31 and 32 are mounted on the mass 1 for rotation with it. In this example these guide rings are in the form of a plurality of blocks or pads; they are fastened in a sealing manner by riveting them to the mass 1. Here, the blocks 32 are secured by means of rivets 37 to the base of the housing 3, while the blocks 31 are secured by rivets 36 to the cover plate 5.

A damper wheel 33 is disposed axially between the guide rings 31 and 32, and is coupled in rotation to the second mass 10. The damper wheel 33 has radial arms 34 which project radially outwards (see FIG. 1) so as to engage with resilient means 20 which, in this example, consist of coil springs 20 which are operatively interposed between the two masses 1 and 10.

The springs 20 are mounted through intermediate end inserts 21, between two consecutive blocks 32, and two consecutive blocks 31, of the respective guide rings, the blocks 31 and 32 being disposed facing each other. The inserts 21 are such as to intercept the radial arms 34.

In this example, the damper wheel 33 comprises two damper plates 133 and 134, which are joined together at their outer periphery by means of a plurality of rivets 38 so as to constitute the radial arms 34. The damper plates 133 and 134 are so shaped as to define, radially inward of the rivets 38, a radial cavity in which a ring 35 is housed. Thus, the damper plates 133 and 134 have, at their inner periphery, portions which are offset axially from each other, while they are brought together and secured at their outer periphery.

The ring 35 is formed with windows 24, disposed in line with further windows 23 of the damper plates 133 and 134. A second series of circumferentially acting coil springs 22 are mounted in the windows 23 and 24, being disposed on a common second pitch circle of smaller radius than the first pitch circle on which the springs 20 lie. The springs 22 (see FIG. 1) are shorter circumferentially than the springs 20, and the latter are provided with friction pads 26, each fitted over a series of turns of the corresponding spring 20, so as to reduce fretting between the springs 20 and the flange of the housing 3.

The second mass 10 comprises an annular plate 11, which is the reaction plate of a clutch. The clutch also has a friction disc (not shown), which is mounted for rotation on the input shaft of the gearbox of the vehicle, and with which the reaction plate 11 is arranged to come into contact.

Figure 2:
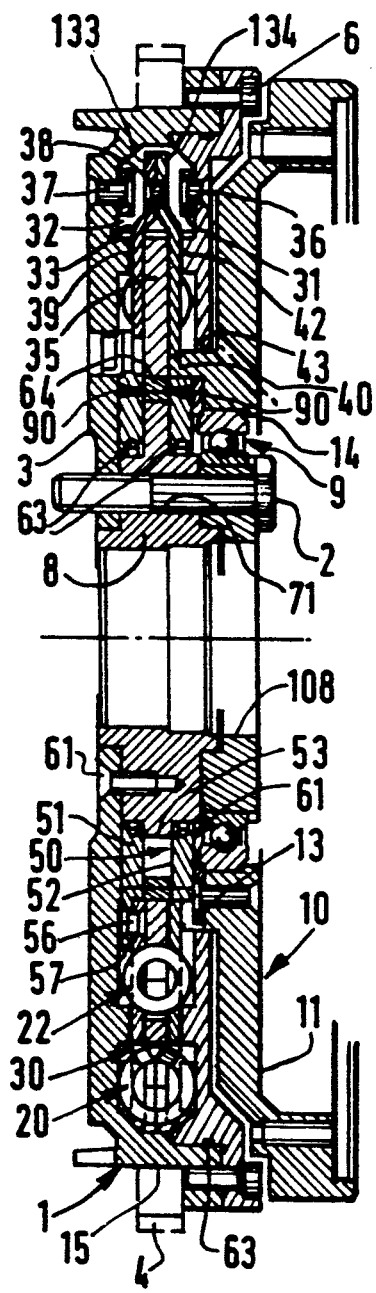
FIG. 2 is a view in axial cross section taken on the line A—A in FIG. 1.

A bearing 9 is interposed radially between the reaction plate 11 and the hub member 108, and is centered on the hub member 8. The bearing 9 may consist of an anti-friction bearing, or a rolling bearing as shown in FIGS. 1 and 2. It is located axially on the hub 8, 108 by means of shoulders formed on the hub members 8 and 108 respectively. Similarly, the bearing 9 is located axially on the reaction plate 11 by means of a shoulder 14 formed in the reaction plate 11 and a shoulder defined by a ring 13, which is secured by means of rivets 15 to the reaction plate 11 adjacent to the viscous damping means 60.

The springs 20 are disposed within a first cavity 30 defined by the two masses 1 and 10 together. The cavity 30 is delimited mainly by the first mass 1, and in particular by its housing 3 and cover plate 5, and by annular, axially oriented wall portions 39 and 42, which are arranged facing each other and which are carried respectively by the housing 3 and the cover plate 5. The cavity 30 is further delimited by the intermediate damper wheel 33, the radial arms 34 of which extend into the cavity 30.

The cavity 30 is filled (partially in this example) with a lubricating grease for the springs 20.

The viscous damping device 60, mechanically interposed between the two masses 1 and 10, defines a second sealed cavity 50, which is filled with a second fluid different from the first fluid with which the cavity 30 is filled. The cavity 50 is again delimited by the masses 1 and 10. This second cavity 50 lies radially inwardly of the first cavity 30. The cavities 30 and 50 are of course sealed by the provision of suitable sealing members, which are indicated in FIG. 2 at 63.

The viscous damping means 60, which it will be noted is fixed with respect to the damping wheel 33, is in the form of a casette, disposed axially between the base of the housing 3 and the bearing 9. Its cavity, i.e. the second cavity 50, is delimited by two cover plates in the form of discs 51 and 52 or annular closure members, which are spaced apart axially from each other by means of an annular peripheral spacer 64.

Each closure member 51, 52 (or 151, 152 and 251, 252 in FIGS. 3 and 5 respectively) is secured to the spacer 64 (or 164, FIG. 3; 233, FIG. 4) by means of at least one continuous weld seam 90, 190, 290, such that the radial thickness of the spacer is reduced. The closure members 51 and 52 are preferably welded to the spacer 64 using a laser welding process. In FIGS. 1 and 2, assembly of the members 51, 52 and 64 is effected by penetration welding through the full axial thickness, so that the weld extends across the closure plates 51 and 52.

The cavity 50 is also delimited by the hub, the member 8 of which carries a flange 53 which projects from it and which is interposed axially between the two closure members 51 and 52. This flange 53 constitutes an internal carrying element carrying radially oriented teeth 55, which extend into the cavity 50 away from the axis of the assembly. The annular spacer 64 constitutes an internal carrying element, and carries at its inner periphery a further set of radially oriented teeth 54, opposed to the teeth 55. The teeth 54 alternate with the teeth 55 in the circumferential direction, and calibrated passages are defined in particular between the teeth 54, 55 and the members 51, 52.

In a variant, the teeth may be omitted, and in that case the flange 53 is in the form of a disc which is a loose fit between the closure members 51 and 52, defining narrow passages between the latter.

The cavity 50 is partially filled with a second fluid having a high viscosity, for example a silicone. As will be understood, the viscous damping means 60 is arranged to be effective in low speed modes, in particular on starting and stopping of the engine, when the mechanism passes through the resonant frequency below the slow running mode of the engine, so as to suppress vibration and to brake the relative angular displacement between the two masses 1 and 2.

In this example, the closure plate 1 carries at its outer periphery an annular flange 57 which is secured to the damper plate 133 by means of rivets 56. The other damper plate 134 is slotted to enable axial projections 40, which are fixed with respect to the reaction plate 11, to pass through it. These axial projections 40 extend radially outward from the bearing 9 between the first cavity 30 and the second cavity 50. The ring 35 is appropriately shaped at the level of the projections 40 so as to mesh with the latter, optionally with a clearance.

The second mass 10 is mounted axially on the first mass 1, by means of the bearing 9 as described above.

The projections 40, which are of low thickness, project directly from the reaction plate 11 and constitute an axially oriented centring means for the viscous damping device 60. In this example the projections 40 are in the form of tenons alternating with mortices, as can be seen from FIG. 2, in such a way that the shape of the reaction plate in this region is that of an annular comb. The tenons and mortices are formed on the end of a cylindrical sleeve 43 extending through the internal bore of the cover plate 5, and are thus in the form of an arc of a circle. The ring 35, which is coupled to the reaction plate 11, optionally with a clearance, has slots complementary to the tenons 40 for cooperation with the latter.

The springs 22 are selected to have a stiffness which is higher than that of the springs 20. While relative angular displacement is taking place between the masses 1 and 10, the motion is transmitted through the guide rings 31 and 32, the springs 20 and the damper wheel 33 with operation of the viscous damping means, and is then transmitted from the damper wheel 33 to the reaction plate 11 by means of the springs 22, and the axial projections 40. During the relative movement between the two masses 1 and 10, the fluid is subjected to shear, and fluid is transferred from one chamber (delimited by a tooth 54, 55) to the other chamber.

Thus if the springs 20 become jammed, damping is still possible by means of the auxiliary springs 22 without any action by the viscous damping means 60.

The inner periphery of the projections 40 cooperates with the outer periphery of the members 52 and 64 of the viscous damping means 60, for centring purposes. There is an axial clearance between the projections 40 and the base of the housing 3, with the projections terminating in front of the damper plate 133. Also, the cooperation between the cylindrical sleeve 43 and the internal bore of the cover plate 5 defines narrow passages. Thus the outer periphery of the sleeve 43 also has a sealing function, such that a seal need not be provided between the cover plate 5 and the sleeve 43. However, a seal in the form of a sealing member or, alternatively, a labyrinth may be provided if required.

In the present example, two weld seams 90 of weld metal are provided, and as mentioned above welding is carried out by penetration welding over the whole axial thickness. Since each weld seam is associated with the spacer 64 and respectively with each of the closure plates 51 and 52, they are accordingly oriented axially and directed towards each other, to join together level with the spacer 64 and within the thickness of the latter. Each seam 90 has a triangular cross section.

The weld seams 90 extend through the members 51 and 52 without severing them, and may extend through the outer part of the spacer 64 as indicated at 90 in FIG. 1. In a variant, the seams may have a sinuous shape, and lie on the outer periphery of the spacer 64 and on the teeth 54 of the latter, as is indicated at 93 in FIG. 1. The seam 90 thus has a shape which is conformed with that of the toothed spacer 64.

In another variant, a weld seam 90 may be provided together with spot welds on the teeth 54, as indicated at 92 in FIG. 1.

Figures 3, 4:
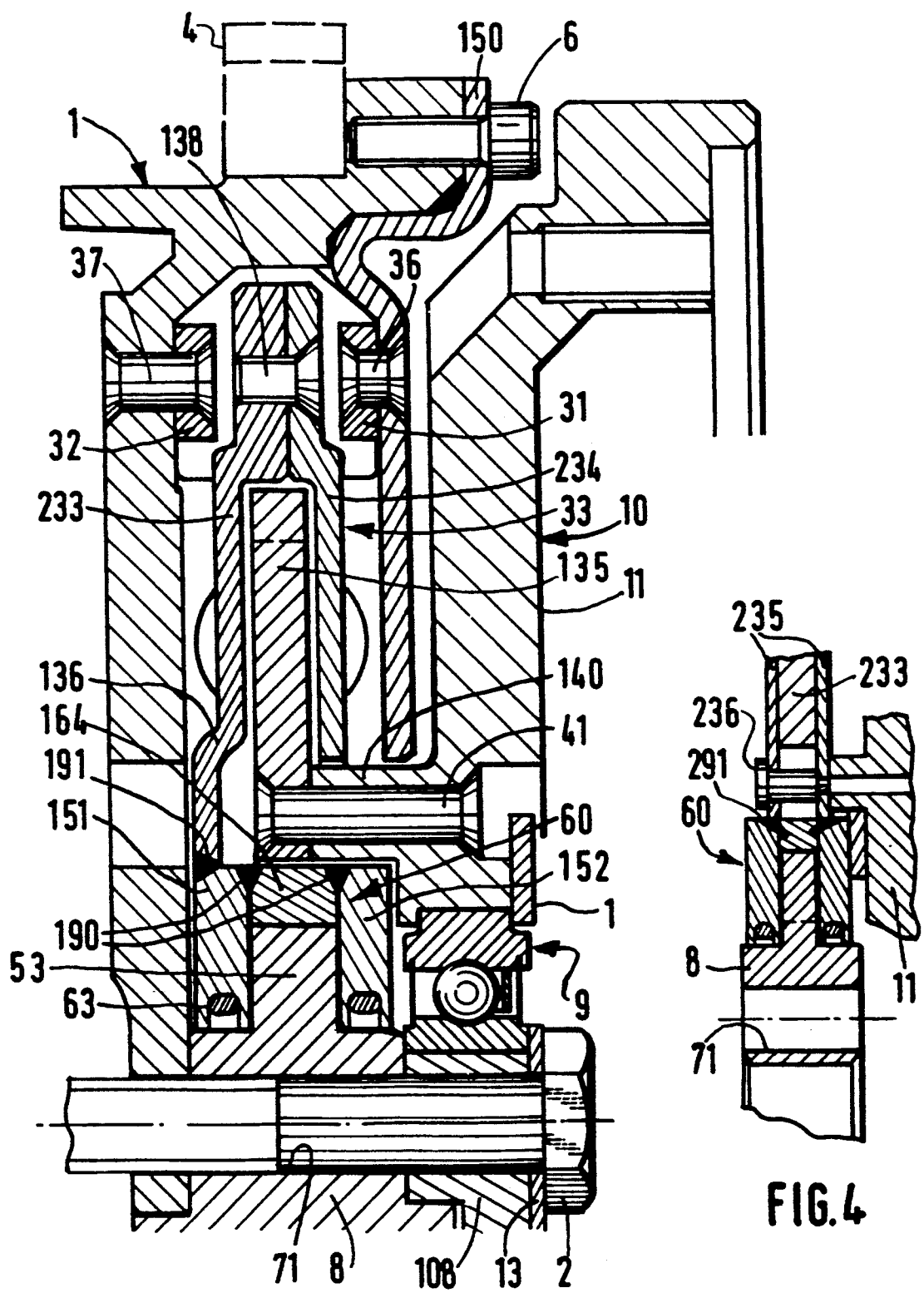
FIG. 3 is a half view, similar to FIG. 2 but showing a second embodiment of the invention.
FIG. 4 is a partial half view, seen in cross section, of the viscous damping means in a third embodiment.

Reference is now made to FIG. 3, in which the welding of the closure plates 151 and 152 to the peripheral annular spacer is of the edge-to-edge type, with the weld rings 190 being of triangular cross section as before and extending radially between the spacer 164 and each of the members 151 and 152. The damper plates 233 and 234 of the damper wheel 33 are joined together by means of screws 138, while the cover plate, here indicated by the reference numeral 150, is of pressed sheet steel. The ring 135 is secured by means of rivets 41 to an annular sleeve 140. As in FIGS. 1 and 2, the sleeve 140 extends through the internal bore of the cover plate 150 and of the damper plate 244. The sleeve 140 extends radially beyond the bearing 9 and serves for centring the damping means 60 by cooperation with the spacer 164.

The damper plate, 233, is secured to the closure plate 151 by welding in a weld seam 191, which is again of triangular cross section but which is oriented axially. To this end, the damper plate 233 has on its inner periphery an axially offset portion 136 joined to the closure plate 151.

In the modified embodiment shown in FIG. 4, the damper plate, here denoted by the reference numeral 333, may itself constitute the spacer, with the weld seams, 291, being again of triangular cross section but in this case inclined with respect to each other and to the radial centre plane.

In that case, only a single range of springs need be provided, with the damper wheel 333, here shown as a single damper plate, being driven in rotation by projections of the reaction plate 11, of the same type as the projections 40 in FIGS. 1 and 2. Thus, the damper plate 333 directly engages the springs 20 through its radial arms 34.

In the further variant shown in FIG. 5, the welding is carried out entirely by penetration welding, that is to say with a seam extending axially across the closure members 251 and 252. However, in this case the latter have, for this purpose, portions 351 of reduced axial thickness.

It will be evident from this description and from the drawings that the overall axial length of the double flywheel is reduced, and that the various components may be mounted in the housing 3 by stacking, while the reaction plate may be fitted in position last.

In addition, the useful part of the viscous damping means 60 is retained, and may even be enlarged. Furthermore, the increase in radius enables sleeves 43, 140 to be provided, which results in a reduction in the axial size as well as a reduction in the forces applied to the viscous damping means.

The present invention is of course not limited to the embodiments described above. The inner support element (in FIG. 2 the flange 53) may be arranged with a clearance between it and the hub member 8, for example by means of splines.

In addition, the damper wheel 33 may be fixed with respect to the viscous damping means 60 only for rotation with it, and may be mounted on the latter by means of a mating fit. Similarly, the projections 40 may mesh, with a clearance between them in which damping elements of resilient material are inserted.

Finally, the first cavity 30 is not indispensible, since the springs 20 and 22 may not be lubricated, and may be in the form of blocks of elastic material.

What is claimed is:

1. A damped double flywheel comprising two inertia masses, means mounting said two inertia masses coaxially with each other for relative rotation with respect to each other, resilient means mounted between two said masses and in coupling relationship therewith, and viscous damping means operatively coupled between two said masses, whereby said resilient means and viscous damping means resist said relative movement between the two masses, the viscous damping means comprising two closure members and an annular, peripheral spacer member spacing said closure members apart whereby to define a sealed cavity between them, and further comprising at least one continuous weld seam joining said closure members to the annular spacer member.

2. A double flywheel according to claim 1, wherein the weld seams are of the penetration type, axially oriented and directed towards each other so as to meet level with the spacer member and within the thickness of the latter.

3. A double flywheel according to claim 2, wherein the spacer member has radial teeth, the weld seams being sinuous in form and disposed both on the outer portion of the spacer member and on said teeth.

4. A double flywheel according to claim 2, wherein the spacer member has radial teeth, with said weld seam being disposed in the outer portion of the spacer member, and further comprising spot welds on said teeth.

5. A double flywheel according to claim 1, wherein the weld seams are of the edge-to-edge type extending radially between the spacer member and each respective said closure member.

6. A double flywheel according to claim 1, wherein the weld seams are inclined with respect to each other.

7. A double flywheel according to claim 1, further comprising a damper wheel consisting of two damper plates, wherein one of said damper plates is connected through said weld seam to one of said closure members of the viscous damping means.

8. A double flywheel according to claim 1, further comprising a reaction plate and axially oriented centering means projecting from the reaction plate and cooperating with the outer periphery of said spacer member for centering the viscous damping means.

* * * * *